Feb. 18, 1958 G. M. WALRAVEN ET AL 2,823,542
COMPRESSION GAUGE FOR INTERNAL COMBUSTION
ENGINES AND THE LIKE
Filed March 23, 1954
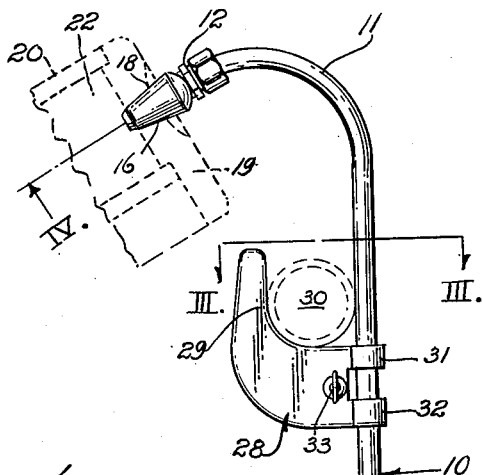
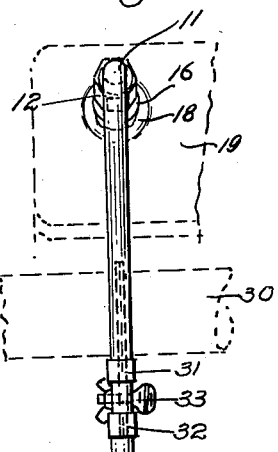
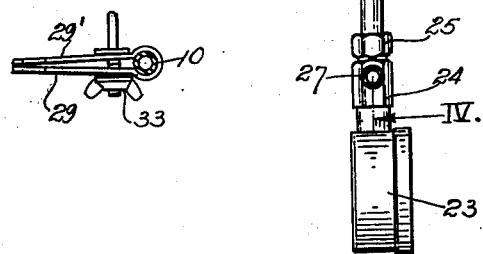
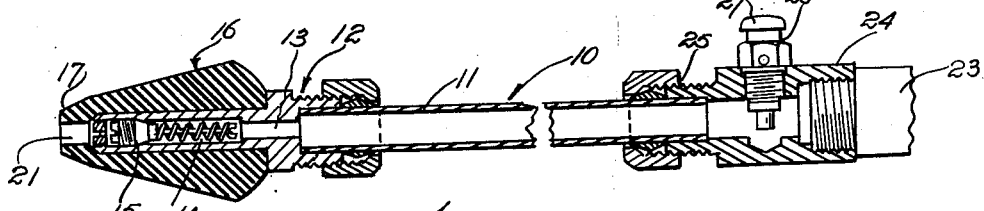
Inventors.
George M. Walraven
Melvin Kenneth Kuehl
BY
Attorney.

United States Patent Office 2,823,542
Patented Feb. 18, 1958

2,823,542

COMPRESSION GAUGE FOR INTERNAL COMBUSTION ENGINES AND THE LIKE

George M. Walraven and Melvin Kenneth Kuehl, Kenosha, Wis., assignors to Snap-On Tools Corporation, Kenosha, Wis., a corporation of Delaware Application March 23, 1954, Serial No. 417,994

2 Claims. (Cl. 73—116)

This invention relates to compression gauges and more particularly to internal combustion engine compression gauges, although certain features thereof may be employed with equal advantage for other purposes.

It contemplates more especially the provision of a simple and effective fulcrum attachment for a compression gauge which enables its ready and effective application to the spark plug opening of an internal combustion engine for measuring the compression within the cylinders of an engine block.

It is imperative in devices of this character that the gauge be in effective sealed communication with the cylinder opening, usually the spark plug mounting hole of the engine cylinder, in order to accurately measure the compression produced therein. To this end, it has been found desirable, inexpensive and exceedingly effective to provide a fulcrum mount on a compression gauge tube which is fitted with a yieldable spark plug hole sealing closure to maintain sealed communication with the gauge responsive to applying physical force through a moment arm applied in relation to the fulcrum mount. This is a ready and effective way of detachably associating the compression gauge in operative relation to the cylinders of an internal combustion engine.

One object of the present invention is to simplify the construction and improve the operation of devices of the character mentioned.

Another object is to provide a simple and effective fulcrum arm mounted on a compression gauge tube for enabling the sealed engagement thereof to an engine cylinder through the spark plug opening therein.

Still another object is to provide a compression tube with a yieldable sealing mount and a fulcrum moment arm member spaced therefrom to effectively expose the gauge to the compression of an internal combustion chamber cylinder.

A further object is to provide a curved tube with a yieldable sealing mount at one end, a compression gauge at the other end, and a fulcrum mount therebetween.

Other objects and advantages will appear from the following description of an illustrated embodiment of the present invention.

In the drawing:

Figure 1 is a side view in elevation of a device embodying features of the present invention.

Figure 2 is a front view in elevation of the mount shown in Figure 1.

Figure 3 is a sectional view taken substantially along line III—III of Figure 1.

Figure 4 is a fragmentary sectional view taken substantially along irregular and curved line IV—IV of Figure 1.

The structure selected for illustration is not intended to serve as a limitation upon the scope or teachings of the invention, but is merely illustrative thereof. There may be consideable variations and adaptations of all or part of the teachings depending upon dictates of commercial practice. The present embodiment comprises an elongated tube 10 preferably terminating at one end in a curved angularly disposed end portion 11 having a threaded friction nipple fitting 12 attached thereto in a manner well known in the art. The nipple 12 has an axial passage 13 therethrough which communicates with an enlarged valve chamber 14 that accommodates a threaded check valve 15 of standard construction.

A conical yieldable spark plug opening sealing member 16 of rubber or other suitable material is shaped so that its pointed end 17 will readily enter a spark plug opening in the cylinder head 19 of an internal combustion engine cylinder 20 (Figure 1). An axial passage 21 in the yieldable sealing member 16, communicates with the axial passage 13 of the nipple 12 through the valve chamber 14. In this manner, the compression within the cylinder bore 22 (Figure 1) will be transmitted to the interior of the tube 10 for measurement by a gauge 23.

The gauge 23 is threadedly connected to a friction union fitting 24 that, in turn, is connected to the other end of the tube 10 as at 25. A standard release valve 26 is in threaded connection with the wall of the union fitting 24 to release the pressure within the tube 10 and on the gauge 23 by manually depressing the button control 27 thereof prior to removing the sealing mount 16 from the spark plug opening 18. In order to effectively apply the yieldable member 16 in sealing engagement with any spark plug opening 18 in a V-shaped engine block 19 and cylinder 20, a hook-shaped fulcrum lever arm member 28 is slidably adjustable along the tube 10 so that its ear portion 29 will engage around the intake manifold pipe 30 with which an internal combustion engine is fitted.

In this manner substantial force can be applied on the yieldable sealing mount 16 against the spark plug opening 18 while a reading on the gauge 23 is taken. This force is easily applied by reason of providing a moment arm of appreciable magnitude between the force applying lever arm and fulcrum 28—30 and the sealing plug 16. To this end, the fulcrum 28 is stamped or otherwise shaped from sheet material to provide confronting hook-shaped plates 29—29' that are supported by enlarged spaced bearing brackets 31—32 slidably fitted on the tube 10. A thumb screw fastener 33 extends through the confronting hook-shaped plates 29—29' to frictionally hold them in any adjusted position along the tube 10. Consequently, this type of compression gauge can be used with V-8 engines of different sizes and design.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. A compression gauge for internal combustion engines and the like comprising an elongated tube, a yieldable spark plug engine opening sealing mount on one end of said tube, a compression gauge on the other end of said tube, and a hook-shaped arm adjustably mounted on said tube to engage a pipe or the like in the vicinity of the spark plug engine opening to which said yieldable sealing mount is applied responsive to application of force normal to said elongated tube about said pipe.

2. A compression gauge for internal combustion engines and the like comprising an elongated tube, a yieldable spark plug engine opening sealing mount on one end of said tube, a compression gauge on the other end of said tube, a hook-shaped arm adjustably mounted on said tube to engage a pipe or the like in the vicinity of the spark plug engine opening to which said yieldable sealing mount is applied responsive to application of force normal to said elongated tube about said pipe, and a fastener for retaining said hook-shaped fulcrum in any adjusted position along said elongated tube.

References Cited in the file of this patent

UNITED STATES PATENTS

| | | |
|---|---|---|
| 1,649,994 | Thal | Nov. 22, 1927 |
| 1,856,023 | Brandt | Apr. 26, 1932 |
| 2,620,656 | Peterson | Dec. 9, 1952 |

FOREIGN PATENTS

| | | |
|---|---|---|
| 574,379 | Great Britain | Jan. 2, 1946 |
| 456,268 | Italy | Mar. 29, 1950 |